United States Patent

Sokolovsky et al.

[11] 3,923,990
[45] Dec. 2, 1975

[54] PHENYCYCLIDINE FOR INDUCING MYDRIASIS IN HUMANS

[76] Inventors: Mordechai Sokolovsky, 10 Rav Ashi St., Tel Aviv; Saul Maayani, 7 Hahistadruth St., Givatayim, both of Israel

[22] Filed: July 30, 1973

[21] Appl. No.: 383,905

[30] Foreign Application Priority Data
Aug. 7, 1972  Israel.................................... 40064

[52] U.S. Cl................. 424/267; 424/244; 424/274
[51] Int. Cl.²........................................ A61K 31/445
[58] Field of Search............................... 424/9, 267

[56] References Cited
UNITED STATES PATENTS
3,097,136  7/1963  Godefroi et al..................... 424/267
3,306,820  2/1967  Krezawoski............................. 424/9

*Primary Examiner*—Jerome D. Goldberg
*Attorney, Agent, or Firm*—Hubbell, Cohen & Stiefel

[57] ABSTRACT

Novel mydriatic compositions containing as the active ingredient a compound of the formula

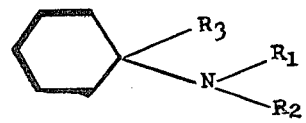

wherein $R_1$ is hydrogen or lower alkyl, $R_2$ is lower alkyl, or $NR_1R_2$ is piperidino, pyrrolidino or hexamethyleneimino $R_3$ is phenyl, thienyl, allyl, vinyl, ethynyl or p-tolyl; lower alkyl as used herein, meaning alkyl group of up to, and including 4 carbon atoms. The novel compositions are characterized by a duration of activity much shorter than that of atropine. They exert a local anaesthetic effect and also act as antidotes to certain myotic substances.

4 Claims, No Drawings

PHENYCYCLIDINE FOR INDUCING MYDRIASIS IN HUMANS

BACKGROUND OF THE INVENTION

Heterocyclic amine compounds of the general formula

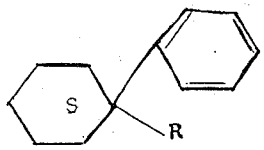

wherein R is pyrrolidino, piperidino or hexamethyleneimino, and the preparation thereof, are known from British Patent No. 836,083. The compounds of this type are known to produce a depressant like effect on the central nervous system when administered to animals or humans. They are stated to be anaesthetic agents per se and useful as adjuncts in anaesthesia. U.S. Pat. No. 3,097,136 describes compounds of the above formula wherein R is

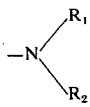

wherein $R_1$ and $R_2$ are hydrogen or alkyl, or where $R_1$ and $R_2$ taken together form a polymethylene radical of 4 to 6 carbon atoms. These compounds are also stated to effect a depressant-like effect on the central nervous system.

A compound of the above general formula, wherein R is a piperidino group, is known under the generic name Phencyclidine. This compound has been used for some time as an anaesthetic agent for i.v. use, but it seems that due to some undesired side-effects its use has decreased.

BRIEF SUMMARY OF THE INVENTION

The present invention relates to novel mydriatic compositions. More particularly, it relates to novel mydriatic compositions, which contain as the active ingredient, phencyclidine, certain derivatives or analogues thereof. The invention further relates to ophthalmological preparations which exert a mydriatic activity which is characterized by a rapid onset of activity and by a relatively short duration. Furthermore, the present invention relates to novel compositions which are useful as antagonists to the myotic activity of certain compounds, such as organo-phosphorus compounds and the like. Other, and further aspects of the present invention will become apparent hereinafter.

DESCRIPTION OF A PREFERRED EMBODIMENT

According to the present invention there are provided novel ophthalmic preparations, and especially ophthalmic solutions, containing as the active ingredient compounds of the general formula

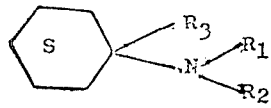

wherein $R_1$ is hydrogen or lower alkyl, $R_2$ is lower alkyl, or $NR_1R_2$ is piperidino, pyrrolidino or hexamethyleneimino. The terms "lower alkyl" as used herein means alkyl of up to and including 4 carbon atoms; $R_3$ is phenyl, thienyl, allyl, vinyl, ethynyl, p-tolyl; and suitable pharmaceutically acceptable salts thereof.

The ophthalmic compositions according to the invention contain from about 0.02 to about 2.0 % by weight of the above active ingredient, together with suitable adjuvants and other components, for adjusting the pH and the like. The novel ophthalmic compositions according to the invention also exert a certain local anaesthetic effect on the parts of the eye in conctact therewith, the intensity of this effect depending on the specific derivative and the quantity used. This combination of mydriatic effect and local-anaesthetic effect is of advantage for various purposes, as only one instead of two preparations is necessary to obtain both effects.

The onset of the mydriatic effect is quite rapid, and the maximum effect is attained with some preparations within 3 minutes.

The compounds of the present invention are prepared by conventional methods known from the literature, and also from the above cited patents.

The process for preparing some of the active piperidino compounds defined above, comprises reacting a 1-piperidinocyclohexanecarbonitrile with a Grignard alkyl halide of the formula RMgX.1-(1-phenylcyclohexyl) piperidine was prepared according to the procedure set out in British Patent No. 836,083.

Compounds of the above formula, wherein $R_1 =$ H $R_2 =$ lower alkyl and $R_3$ is phenyl were prepared according to the procedure of Kalir et al., J.Med.Chem.12 (1969), 473. Compounds wherein $R_1$ and $R_2$ are lower alkyl were prepared according to Maddox et al., J.Med.Chem, 8 (1965) 230.

The following Examples are to be construed in a non-limitative manner.

EXAMPLE 1

3.46 kg. of 1-piperidinocyclohexanecarbonitrile in 9 liters of benzene are added with stirring to a refluxing solution of phenyl magnesium bromide prepared from 1.094 kg. of magnesium turnings and 7.065 kg. of bromobenzene in 22.4 liters of ether. After the addition has been completed, about one half hour, the reaction mixture is allowed to stand at room temperature for 16 hours. The ether is removed by distillation, the residue cooled and 25.5 liters of 2 N hydrobromic acid added to the residue. About 20 liters of ether are added to the mixture and it is allowed to stand at 0°C. for about 16 hours. The crystalline 1-(1-phenylcyclohexyl) piperidine hydrobromide is collected and suspended in 4 liters of 3 N hydrobromic acid. The mixture is cooled to 10°C and the crystalline 1(1-phenylcyclohexyl)-piperidine hydrobromide collected; m.p. 214°–218°C. This product can be purified further by recrystallization from a methanol-ether mixture.

4.2 kg. of 1-(1-phenylcyclohexyl)piperidine hydrobromide are slurried with water at 60°C and then treated with 770 g. of sodium hydroxide in 5 l. of water, 16 l. of benzene are added to the mixture with stirring and then 300 g. of diatomaceous earth are added. The mixture is filtered and the organic layer separated. The aqueous layer is extracted with a total of 8 l. of benzene and the benzene extract is added to the main organic layer. The organic extracts are dried over anhydrous sodium sulfate, charcoaled and filtered. Most of the solvent is removed by distillation in vacuo and the residue treated with 2 l. of methanol. The mixture is allowed to stand for about 16 hours and then the crystalline 1(1-phenylcyclohexyl)piperidine collected; m.p. 46°–46.5°C.

2.3 kg. of 1-(1-phenylcyclohexyl)piperidine are dissolved in 3.45 l. of a mixture composed of one third benzene and two thirds anhydrous ether. The resulting solution is saturated with dry hydrogen chloride gas, cooled and the crystalline 1-(1-phenylcyclohexyl)-piperidine hydrochloride collected and washed with anhydrous ether; m.p. 243°–244°C.

EXAMPLE 2

Preparation of 1-(1-p-tolylcyclohexyl)piperidine

A quantity of 43 g piperidine was added dropwise to 42 ml of concentrated hydrochloric acid in 100 ml water, at 0°C. The addition was effected under constant stirring. At the end of the addition, the pH was adjusted to pH 3.0 by adding aqueous hydrochloric acid. There were added 50 g of cyclohexanone and after this 27 g sodium cyanide in 150 ml water. The solution was stirred during the addition, and for 2 hours thereafter. After standing overnight, there was formed a precipitate, which was filtered off, washed with a small quantity of cold water, and dried. There were obtained 86 g of 1-piperidinocyclohexanecarbonitrile, M.P. 65°–68°C.

A Grignard reagent was prepared from p-bromotoluene by adding dropwise 85 g p-bromotoluene in dry ether to 13 g of magnesium shavings in dry ether. At the end of this reaction, there was added under cooling and with constant stirring a solution of 80 g of the compound obtained in the first stage, in ether. A heavy precipitate was formed. After the addition, the reaction mixture was left to stand for 3 hours. The complex was decomposed by the addition of a concentrated solution of ammonium chloride. Two layers were formed, and from the etheral layer the p-tolyl analogue of phencyclidine was extracted with an aqueous solution of hydrochloric acid. The free base was obtained by adding ammonia and ether and the ethereal solution was distilled after evaporation of the ether. The m.p. was 67°C, yield 40% calculated on the carbonitrile. The m.p. of the hydrochloride was 217°C. Elemental analysis: C, 73.5%; H, 10.1%; N, 4.9%; chlorine: 12.2%. Thin layer chromatography gave an $R_f$ value of 0.2 (acid alumina/chloroform) and 0.7 (neutral alumina, chloroform/benzene 1:1).

EXAMPLE 3

N-ethyl-1-phenylcyclohexylamine

A solution of 76 g (0.5 mole) of 25 in 200 ml of $Et_2O$ was added to PhLi prepared from 236 g (1.5 moles) of PhBr and 25 g of Li ribbon in 800 ml of $Et_2O$ at such a rate that a gentle reflux was maintained. The mixture was heated and stirred 30 min., then filtered quickly and the filtrate cautiously was poured on crushed ice. The organic layer was separated, dried, and fractionally distilled.

EXAMPLE 4

N-Methyl-1-phenylcyclohexylamine

Phenyllithium was prepared from lithium wire (36.4g., 5.2 g.-atoms) and bromobenzene (376 g., 2.4 moles) in a total of 1900 ml. ether. To this was added N-cyclohexylidenemethylamine (165 g., 1.48 moles) in 300 ml. of anhydrous ether over a period of 45 min. After 3 hr. at reflux, 1.5 l. of water were added, and the ether layer was separated, water washed, and dried ($MgSO_4$). After removal of ether the residue was distilled. There were obtained 298 g. (65%) of product, b.p. 76°–78° (150 u). Infrared analysis showed no absorption characteristic of the C—N bond.

The hydrochloride was prepared by treating the base in ether the HCl, m.p. 185°–186°.

Anal. calculated for $C_{13}H_{20}ClN$: C,69.16; H,8.93. Found: C, 69,09; H, 8.90.

EXAMPLE 5

N,N-Dimethyl-1-phenylcyclohexylamine

N-Methyl-1-phenylcyclohexylamine (188 g., 0.993 mole) and formic acid (102 g., 2.22 moles) were mixed, and to the solution was added 87 g. of 38% formaldehyde. A vigorous exothermic reaction took place. The reaction mixture was then warmed on a steam bath for 1 hr., basified with 5 N NaOH, and extracted with ether. After drying the solution and removing the ether, the residue was distilled in vacuo. The product was obtained in a yield of 168 g. (83%), b.p. 96°–98° (50–60 $\mu$). The liquid readily crystallized, m.p. 42°–44°.

Physiochemical data of compounds wherein $R_1$ is hydrogen or lower alkyl, $R_2$ is lower alkyl, or where $R_1$ and $R_2$ designate $C_4H_8$— and wherein $R_3$ is phenyl are given in the following Table:

TABLE I

| No. | $R_1$ | $R_2$ | M.P. (°C) | A | B | $R_f$ |
|---|---|---|---|---|---|---|
| 1 | H | $CH_3$ | 186 | 0.2 | 0.3 | |
| 2 | $CH_3$ | $CH_3$ | 166 | 0.3 | 0.5 | A — Acidic alumina (Woelm)-chloroform. |
| 3 | H | $C_2H_5$ | 235 | 0.2 | 0.3 | |
| 4 | H | $i-C_3H_7$ | 233 | 0.5 | 0.7 | B — Neutral alumina (Woelm)-chloroform. |
| 5 | —$C_4H_8$— | | 238 | 0.4 | 0.5 | |

In an analogous manner various other derivatives were prepared, and the data for these derivatives are given in the following Table II:

TABLE II.

| NO. | R— | M.P. °C | Rf (T.L.C.) |
|---|---|---|---|
| 1 | furyl-phenyl | 229 | 0.4(A); 0.5(B) |
| 2 | thienyl | 184 | 0.4(A); 0.8(B) |
| 3 | $CH_3$-furyl-phenyl | 217 | 0.2(A); 0.7(B) |

TABLE II.-continued

| NO. | R— | M.P. °C | Rf (T.L.C.) |
|---|---|---|---|
| 4 | $CH_2=CH-$ | 218 | 0.2(A); 0.4(B) |
| 5 | $CH_2=CH-CH_2-$ | 110 | 0.4(A); 0.8(B) |
| 6 | $HC\equiv C-$ | 247 | 0.3(A); 0.7(B) |
| 7 | $C_2H_5-$ | 221 | 0.3(A); 0.6(B) |

A: Acid Alumina (Woelm), chloroform;
B: Neutral alumina (Woelm) chloroform/benzene, 1:1;
C: Silica (Woelm) methanol/methylene chloride/acetic acid: 1:1:1).

Ophthalmic solutions were prepared, and the effect of variations of concentration, pH and other factors were determined. It was found that the best effects are attained at a pH of about 7.0 to 8.0. Above pH 8.0 the solubility of the compounds used was not great enough.

The experiments were carried out first on eyes of test animals, such as mice and guinea pigs. Afterwards, experiments were conducted on monkeys and also on humans.

The solutions of pH 7.4 (0.1 M phosphate buffer) of various phencyclidine derivatives were tested at various concentrations. A minimum concentration of $10^{-4}M$ of phencyclidine was required for the mydriatic effect. Onset time was about 2 minutes from the application in the form of drops directly into the eye. This compares with about 10 minutes onset time of $10^{-4}M$ atropine. The duration of the maximum effect was about 15 minutes, and after the effect subsided during a further 15 minutes to normal. An antagonism against cholinergic compounds was obtained with phencyclidine, while none was observed with atropine. The duration of the effect of atropine lasted for more than 2 hours. At a concentration of $10^{-2}M$ local anaesthesia of the eyeball was obtained with phencyclidine, and none with atropine.

Similar experiments were conducted with various derivatives and analogues of phencyclidine, and some of these are presented in the following Table III:

The solutions were in phosphate buffer (pH 7.4), and it is clear from the above data that the most effective are the compounds of group I, namely phencyclidine, the thienyl derivative, the p-methyl (i.e., R=tolyl) derivative and the ethynyl derivative. The drops were applied to mice eyes, one of the eyes serving as a control. The examination was carried out with a binocular microscope of 20x magnification under strong illumination.

The following Table IV illustrates the effect of changes of pH on the mydriatic effect:

Dependance of Mydriatic Effect on pH.

TABLE IV.

| pH | Phencyclidine (M) | | | Atropine (M) | | | |
|---|---|---|---|---|---|---|---|
| | HCl $10^{-3}$ | $10^{-2}$ | $CH_3I$ $10^{-2}$ | $SO_4$ $10^{-4}$ | $10^{-3}$ | $CH_3I$ $10^{-4}$ | $10^{-3}$ |
| 5 | − | − | | − | + | | ++ |
| 6 | − | − | not active | − | ++ | not active | ++ |
| 7 | + | ++ | | ++ | ++ | | ++ |
| 8 | ++ | ++ | | ++ | ++ | | ++ |

(−) : not active
(+) : active
(++) : very active

From the Table it is clear that at a pH below 7.0 the mydriatic effect disappears, and that quaternization also results in lack of mydriatic effect.

From the above it is clear that phencyclidine, and some of its derivatives, and especially the 2-thienyl, p-tolyl and ethynyl derivatives, are effective mydriatics,

TABLE III

| Compounds | Onset time (min.) | Degree of the effect | Duration (min.) | Antagonism |
|---|---|---|---|---|
| Group I ($10^{-3}M$) R= 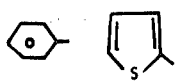 | 2 | maximum | 10–15 | 1. $10^{-4}M$ AcCH 2. $5\times10^{-3}M$ THA |
| Group II ($10^{-2}M$) R= $CH_2=CH-$  $CH_2=CHCH_2-$, $C_2H_5-$, NC—,  | 2 | 70% of the maximum | 4 | $10^{-6}M$ AcCH |
| Group III ($10^{-2}M$) R=  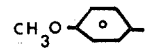 Inactive as mydriatics | | | | | and that these have various advantages as compared with the conventional mydriatic, atropine. Onset of the maximum effect is much more rapid (less than 5 minutes for a maximum effect as compared with about up to 30 minutes for atropine), Duration is of comparatively brief period (about 15 minutes of maximum effect, and decrease to normal after a further 15 minutes, as compared with more than 2 hours till normal with atropine). When atropine is applied to the human eye, the patient is hindered in many normal activities, such as driving a car, for a prolonged period of time, (1–2 days). When phencyclidine or its derivatives is applied, this period is much shorter, and thus the patient can return to normal activity within a short time after examination by the physician. It is possible to apply ophthalmic drops containing phencyclidine or one of its derivatives twice, if the duration of the effect is too short to enable completion of the examination. Within a short time after the completion of the examination the mydriatic effect disappears and the patient can resume any normal activity.

The active ingredient is advantageously used as a salt (and especially as hydrochloride), and concentrations of from about 0.02 to 0.2% by weight were found to be satisfactory. The pH is adjusted to about 7.3–7.7 by the use of any acceptable buffer, and especially by phosphate buffer. The ophthalmic solutions according to the invention may contain other ingredients, such as benzalkonium chloride or the like.

Experiments have shown that cholinergic drugs have a pronounced antagonistic effect againsts the mydriatic activity of the compositions according to the invention. The antagonism was tested with a number of compounds of the above general formula, and data obtained with phencyclidine are given hereinafter, to illustrate this effect. It is clear that cholinergic drugs can be used as effective antidotes to the effects brought about by the compositions of the invention.

It is clear that the above is by way of example only and that the present invention relates to ophthalmic compositions for use as mydriatics and also as antagonists against certain myotic substances, said compositions of matter containing an active ingredient phencyclidine or a derivative thereof of the type exemplified, and especially the 2-thienyl, the p-methyl (p-tolyl), the allyl and the ethynyl analogues, as well as other suitable analogues of the same type.

TABLE V

CHOLINERGIC DRUGS AS ANTIDOTES TO MYDRIATIC ACTIVITY OF PHENCYCLIDINE

| AGENT | DOSE$^{(1)}$(M) |
|---|---|
| A. Acetylcholine Antagonist | |
| 1. Oxotremoline | $6 \times 10^{-4}$ |
| 2. Arecoline | $1 \times 10^{-3}$ |
| 3. 3-acetoxyquinuoclidine | $1 \times 10^{-1}$ |
| B. ChE-inhibitors | |
| 4. Eserine | $1 \times 10^{-6}$ |
| 5. Tacrine | $1 \times 10^{-1}$ |
| 6. Phospholine | $1 \times 10^{-3}$ |

$^{(1)}$ To antagonize $10^{-2}$M phencylidine (minimal dose)

EXAMINATION OF ANTAGONISTIC EFFECT 3 minutes after local application of $10^{-2M}$ phencyclidine (pH = 8.0, 0.1 M phosphate buffer) a drop of the tested buffered drug solution was locally dropped on the same eye. The pupil diameter was measured (binocular microscope $\times$ 40), and calculated as percent of the whole eye diameter.

| TIME$^{(x min)}$ | % (Pupil diameter) |
|---|---|
| 0 | 92 |
| 1 | 88 |
| 2 | 80 |
| 3 | 74 |
| 4 | 67 |
| 5 | 62 |
| 6 | 56 |
| 7 | 53 |
| 8 | 51 |
| 9 | 48 |
| 10 | 47 |

$^{1)}$After $10^{-2}$M arecoline local application.

What is claimed is:

1. A method of inducing mydriasis in humans for examination purposes, which comprises applying phencyclidine to an eye in an amount effective to dilate the pupil of the eye treated therewith.

2. The method of claim 1, wherein the phencyclidine is applied in the form of an ophthalmic solution containing from about 0.02 to 0.2% by weight of phencyclidine and a buffer in an amount sufficient to adjust the pH of the solution to 7 to 8.

3. The method of claim 2, wherein the pH of the solution is 7.3–7.7.

4. The method of claim 2, wherein said buffer is a phosphate buffer.

* * * * *

UNITED STATES PATENT OFFICE
CERTIFICATE OF CORRECTION

Patent No. 3,923,990          Dated December 2, 1975

Inventor(s) Mordechai SOKOLOVSKY and Saul MAAYANI

It is certified that error appears in the above-identified patent and that said Letters Patent are hereby corrected as shown below:

Title page, line 4 after the formula, in the Abstract:

"meaning alkyl" should read -- meaning an alkyl --.

Column 2, line 15: "conctact" should read -- contact --;

line 58: "1(1-phenylcyclohexyl)-" should read -- 1-(1-phenylcyclohexyl)- --.

Column 3, line 7: "1(1-phenylcyclohexyl) piperidine" should read -- 1-(1-phenylcyclohexyl) piperidine --; line 45: "etheral" should read -- ethereal --.

Column 5, line 29: "after the" should read -- after this the --.

Column 7, line 33: "againsts" should read -- against --.

Signed and Sealed this sixth Day of April 1976

[SEAL]

Attest:

RUTH C. MASON
Attesting Officer

C. MARSHALL DANN
Commissioner of Patents and Trademarks